US012699302B2

(12) United States Patent
Gariano et al.

(10) Patent No.: US 12,699,302 B2
(45) Date of Patent: Aug. 4, 2026

(54) ENCODER FOR QUANTUM COMMUNICATIONS

(71) Applicant: General Dynamics Mission Systems, Inc., Fairfax, VA (US)

(72) Inventors: John Anthony Gariano, Chandler, AZ (US); Todd M. W. Hodges, Mesa, AZ (US); Claudia Ann Gamble, Annapolis, MD (US); John M. Liebetreu, Scottsdale, AZ (US); Jerry Kwa-Wor Tong, Chandler, AZ (US); Juan C. Juarez, Ellicott City, MD (US)

(73) Assignee: General Dynamics Mission Systems, Inc., Fairfax, VA (US)

( * ) Notice: Subject to any disclaimer, the term of this patent is extended or adjusted under 35 U.S.C. 154(b) by 338 days.

(21) Appl. No.: 18/594,112

(22) Filed: Mar. 4, 2024

(65) Prior Publication Data

US 2025/0284177 A1       Sep. 11, 2025

(51) Int. Cl.
*G02F 1/35* (2006.01)
*G02F 1/39* (2006.01)
(52) U.S. Cl.
CPC .............. *G02F 1/3526* (2013.01); *G02F 1/39* (2013.01)

(58) Field of Classification Search
CPC .......................... G02F 1/3526; G02F 1/39–397
See application file for complete search history.

(56) References Cited

U.S. PATENT DOCUMENTS

| | | | |
|---|---|---|---|
| 2024/0340090 A1* | 10/2024 | Hodges | H04J 14/02 |
| 2025/0110380 A1* | 4/2025 | Cuevas | G02F 1/353 |
| 2025/0284177 A1* | 9/2025 | Gariano | G02F 1/3526 |

* cited by examiner

*Primary Examiner* — Rhonda S Peace
(74) *Attorney, Agent, or Firm* — Ingrassia Fisher & Lorenz, LLP

(57) ABSTRACT

A stream of photons from an optical source at a source wavelength are converted into entangled photon pairs via a spontaneous parametric down-conversion process. This produces time-synchronized signal and idler photon pairs which share a nominal wavelength, twice the source wavelength, a common polarization. The signal and idler individually have wavelengths that are equally offset above and below their nominal wavelength. The photons segregated into two paths based on wavelength via a wavelength division multiplexer. A phase modulator in the signal path alters the phase of the signal photon, while the idler photon's phase remains unchanged. By applying a modulation signal to the phase modulator, a quantum message is encoded on the photon pair. A multi-channel wavelength division multiplexer may be used to support multiple channels, each carrying signal-idler pairs conveying a quantum encoded message.

10 Claims, 2 Drawing Sheets

ENCODER FOR QUANTUM COMMUNICATIONS

TECHNICAL FIELD

The disclosure relates generally to quantum communications and more particularly to a signal encoding method and apparatus that utilizes quantum entangled photons.

BACKGROUND

This section provides background information related to the present disclosure which is not necessarily prior art.

Traditional optical communications systems can be susceptible to interference and eavesdropping. Quite frequently the signal path from transmitter to receiver may traverse weak points (links or nodes) that are not secure. At such weak points, a classically encoded signal can be read or altered, sometimes without leaving a trace that security has been breached.

Some have proposed using quantum techniques for enhancing security, but many of these proposed quantum-based communication systems rely on quantum memory. Manipulating qubits in such systems can be quite challenging because the entangled state is destroyed when the qubit is read. Additionally, reconciliation of the measured quantum states requires high communication overhead under quantum key distribution (QKD) protocols.

SUMMARY

The disclosed encoder for quantum systems takes a different approach in which entangled photons are produced from a time-energy spontaneous parametric down conversion source, yielding a signal and idler pair.

The disclosed encoder encodes a message on the signal photon by adjusting its phase relative to the idler photon. Then both photons are sent—still in the entangled state—to the output of the encoder.

Thus both signal and idler photons travel together, in time synchronization from the encoder to the downstream destination, where a suitable decoder may be situated. In an encoded message of any substance, many such entangled signal and idler pairs are generated and modulated sequentially, thus serving as an information carrier, where the message is encoded by adjusting the differential phase of the signal and idler photons.

By encoding the message in the entangled state of the signal and idler pairs, the quantum encoded message is effectively carried by the entangled pairs as they propagate through the transmission system (e.g., optical waveguide or free space) at the speed of light. These "flying qubits" in many respects behave as qubits in a quantum computer and are thus capable of being manipulated using many of the same quantum gates as found in quantum computers.

More specifically, the disclosed encoder generates the entangled photons through spontaneous parametric down-conversion (SPDC). The process converts optical energy at a pump wavelength into a stream of signal and idler photons, in entangled pairs which are correlated in their generation time and share several subatomic properties. As a consequence of the SPDC process, each pair of signal and idler photons satisfy both conservation of energy and conservation of momentum.

In accordance with one aspect, the disclosed encoder for quantum communications employs a source producing a stream of source photons at source wavelength having an associated source energy. A spontaneous parametric down-conversion (SPDC) device receives the source photons and produces therefrom entangled photon pairs (at least one entangled photon pair), wherein a first one of the photon pair is identified as a signal photon having a signal photon wavelength and a second one of the photon pair is identified as an idler photon having an idler photon wavelength. Not every source photon triggers the generation of entangled photon pairs due to the conversion efficiency of the device being less than 100%.

The entangled photon pair having the following properties:

(a) the signal photon and the idler photon are correlated in their generation time by virtue of spontaneous parametric down conversion; and (b) the sum of the signal photon and the idler photon energies in each pair is equal to the corresponding pump energy from which they were created.

The encoder further includes a first wavelength division multiplexer device defining on the basis of wavelength a signal photon path corresponding to the signal photon wavelength and an idler photon path having an associated second channel wavelength corresponding to the idler photon wavelength.

A phase encoder is disposed in the signal or idler path and operable to alter the phase of the signal photon stream. An encoding signal source is coupled to the phase encoder to supply an encoding signal, causing the phase encoder to alter the differential phase relationship of the signal and idler photons to thereby carry the encoding signal.

In accordance with another aspect, a multi-channel encoder for quantum communication is disclosed. The multi-channel encoder employs a source producing a stream of source photons at a source wavelength. A spontaneous parametric down-conversion (SPDC) device receives the source photons and produces therefrom a plurality of entangled photon pairs, wherein a first one of each of the plurality of entangled photon pairs is identified as a signal photon having a signal photon wavelength and a second one of each of the plurality of entangled photon pairs is identified as an idler photon having an idler photon wavelength.

The plurality of entangled photon pairs having the following properties:

(a) the signal photon and the idler photon of each pair have substantially the same creation time by virtue of spontaneous parametric down conversion;

bI the plurality of entangled photon pairs collectively have a nominal wavelength that is twice the source wavelength (i.e., each photon stream has a wavelength that is approximately double the pump wavelength—thus half the energy);

(c) the sum of the signal photon and the idler photon energies in each pair is equal to the corresponding pump energy from which they were created.

The encoder further includes a first wavelength division multiplexer device defining on the basis of wavelength a plurality of channels each having a signal photon path and an idler photon path, wherein the signal photon and idler photon paths of each channel have respective signal photon and idler photon wavelengths that are different from all other channels.

A plurality of phase encoders are disposed, one each in the signal paths of each channel, and operable to alter the phase of the signal photon stream in the respective channel. An encoding signal source is coupled to each of the phase encoders to supply an encoding signal causing the phase encoder in each respective channel to alter the phase relationship of the signal and idler photons in that channel to thereby carry encoding signals in each of the channels.

BRIEF DESCRIPTION OF THE DRAWINGS

The drawings described herein are for illustrative purposes only of selected embodiments and not all possible implementations. The choice of drawings is not intended to limit the scope of the present disclosure.

FIG. 2 is a block diagram giving a detailed view of a multi-channel quantum encoder configuration useful in the quantum optical communications encoder of FIG. 1*a.

DETAILED DESCRIPTION

Figures 1A, 1B, 1C:
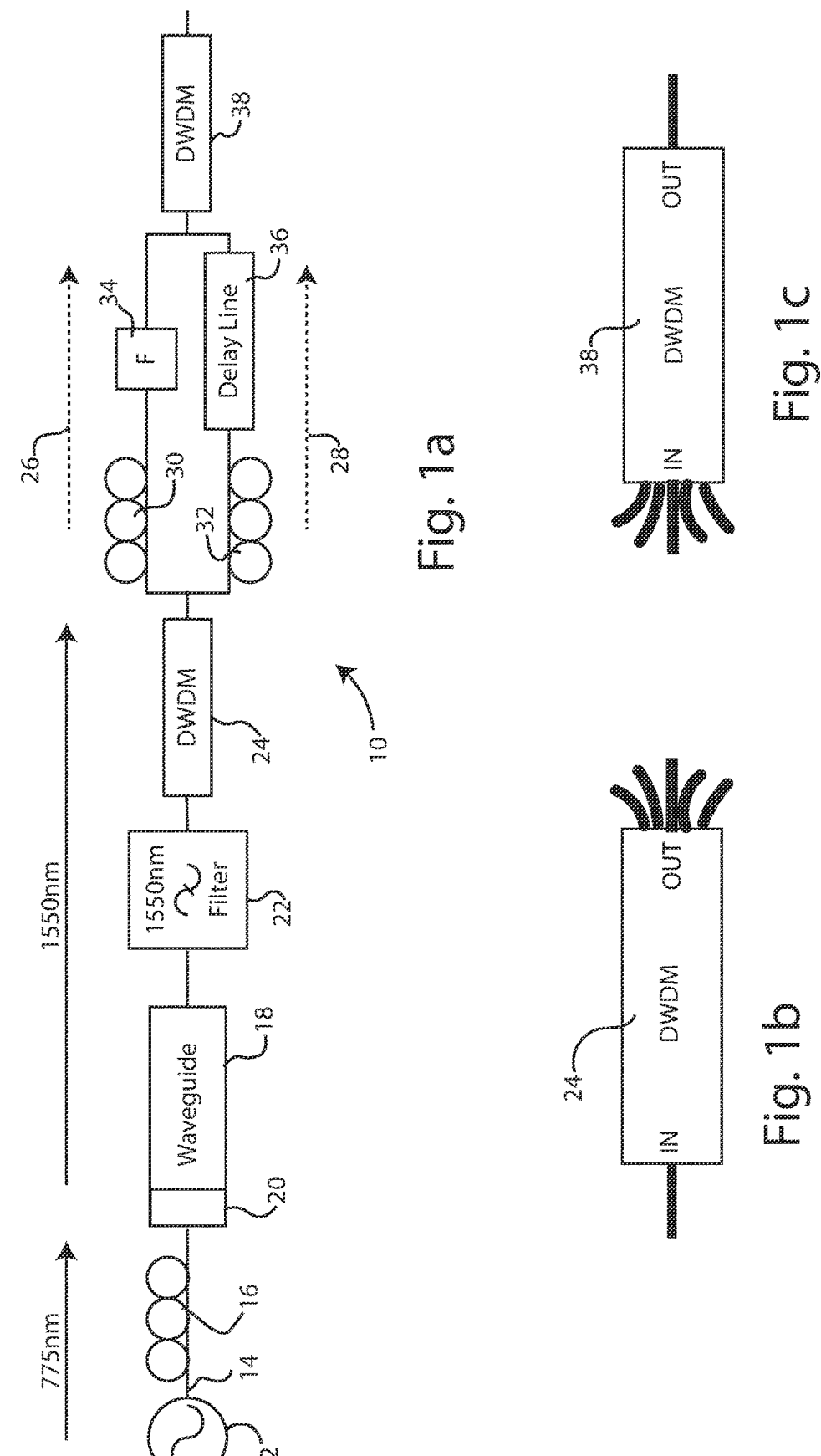
FIG. 1*a* is a block diagram of a quantum optical communications encoder.
FIGS. 1*b* and 1*c* illustrate details of the dense wavelength division multiplexers (DWDM) employed in the quantum optical communications encoder of FIG. 1*a;*

Referring to FIG. 1*a*, the quantum optical encoder 10 employs a pump laser source 12 which produces a beam of photons 14 at the laser wavelength (shown as a 775 nm wavelength in the figure). The choice of using 775 nm to describe the embodiment is merely exemplary, as other wavelengths can be used as well. Furthermore, the wavelengths illustrated in other portions of the described embodiment are also exemplary, based in part on the laser wavelength chosen.

The photon beam 14 is passed through a polarization controller 16 configured to ensure that the photons are in the correct polarization to meet the polarization requirements of the waveguide (SPDC source).

Polarization is a property of transverse waves which specifies the geometric orientation of the oscillations. In this case the waves involved are electromagnetic waves associated with the photons comprising the photon beam. By convention the polarization of an electromagnetic wave is defined by the orientation of the electric field (E-field) of the electromagnetic wave. Thus by passing the photon beam 14, substantially all of the photons comprising the electromagnetic wave have the substantially same polarization.

The photon beam 14 exiting the polarization controller 16 is passed through path comprising waveguide 18 and a non-linear optical element 20. In one embodiment the non-linear material (lithium niobate) is housed within a device from which the entrance and exist fiber-optic cables protrude. waveguide may be implemented using an optical fiber, for example In another embodiment the nonlinear optical element 20 may be implemented as a discrete device positioned at the input of the waveguide, or it may be formed as an integral part of the waveguide.

The non-linear optical element 20 is made of a non-linear material (e.g., crystal), such as a birefringent crystalline material. Crystals of Beta Barium Borate, a lithium niobate or potassium dihydrogen phosphate may be used, for example. When photons are fed into such a non-linear material a process known as spontaneous parametric down-conversion (SPDC) occurs, producing quantum-entangled photons. A more detailed discussion of the physics involved in the SPDC process is described below. The descriptive term down-conversion conveys the fact that the frequencies of the resulting entangled photons are lower than the pump frequency. Frequency is proportional to wavelength, with speed of light c being the proportionality constant. Thus $f=c/\lambda$ and $\lambda=c/f$. Thus the wavelengths of the resulting entangled photons are longer than the pump wavelength.

In the embodiment illustrated in FIG. 1*a*, one can see that the 775 nm pump wavelength, when fed through the non-linear optical element 20, produces 1550 nm output photons, as indicated in the figure. However, not all of the 775 nm pump photons are employed to produce 1550 nm entangled photons. On the contrary, the vast majority of the 775 nm pump photons pass unchanged through the non-linear material and thus exit the waveguide 18 at the original pump wavelength (775 nm).

In the disclosed optical communications encoder, only the newly created entangled 1550 nm photons are needed for the encoding process. Thus a filter 22 having a passband at 1550 nm is inserted at the output of waveguide 18 to effectively filter out the 775 nm pump photons remaining.

The Quantum Physics of Spontaneous Parametric Down-Conversion

From a subatomic perspective, the atoms comprising the non-linear crystal are quite spaced apart relative to a passing pump photon. Thus many pump photons pass through the crystal unchanged. However, a relatively small percentage of photons will collide with an atom of the crystal. Such collision annihilates the pump photon and creates two lower energy photons.

Creation or annihilation of photons is a fundamental way that the electromagnetic field exchanges energy with matter. A photon can be destroyed, promoting an electron in an atom from one energy state to another, provided that the energy difference between the initial and final states is equal to the energy of the photon. The promoted electron thereafter falls to a lower energy state(s) within the atom, creating photon(s) in the process.

Spontaneous parametric down-conversion is a quantum process. It cannot be described by classical Maxwell's equations because it involves interactions with the vacuum state, where classically speaking, the electric field is zero. Moreover, being a quantum process, the times at which the two resulting photons are created are very strictly controlled by quantum physics, as follows.

A photon can be considered a particle with energy $E=h\omega$ and momentum $p=hk$. When such photon is annihilated, two photons are created in its place, having energies $E=h\omega_1$ and $E=h\omega_2$, where $h\omega=h\omega_1+h\omega_2$, conserving energy. Similarly $hk=hk_1+hk_2$, conserving momentum. This means that the two lower energy photons are created in pairs substantially simultaneously (i.e., within a time interval less than $1/\omega_3$ from the annihilation of the higher energy photon in order to conserve energy.) In these equations, k is the wave vector.

The SPDC process produces photons over a wide band of frequencies that satisfy the non-linear processes phase matching condition (i.e. conservation of energy and momentum are satisfied).

By virtue of the spontaneous parametric down-conversion event, the pair of photons produced are time-energy entangled and are correlated in their generation time.

From a layman's point of view, the two resulting photons can be thought of as having been created at essentially the same instant—and this is true with every such creation event. The process is highly repeatable and requires no human intervention. This precise timing becomes important when we consider the encoding process discussed below.

Having been created by the same quantum event, these photons share several important quantum properties and are said to be entangled. By convention, one of the entangled photons is called the signal and the other the idler.

One of these properties shared by the entangled photon pair is the specific wavelength or frequency relationship which results from the conservation of energy and momentum discussed above. Below it will be shown how the wavelength relationships of each entangled photon pair allow them to be channelized based on wavelength.

Another of the properties shared by the entangled photon pair is polarization. Specifically, the signal and idler photons share a polarization relationship that depends on the nature of the non-linear crystal that created them. For convenience the SPDC process can be organized into types on the basis of polarization as follows:

Type-0: the signal and idler photons share the same polarization with each other, and with the annihilated pump photon;

Type-1: the signal and idler photons share the same polarization with each other, but are orthogonal to the annihilated pump photon;

Type-2: the signal and idler photons have orthogonal polarization.

These polarization types depend on the nature of the non-linear crystal chosen.

In the described embodiment, it is convenient (but not altogether necessary) that the signal and idler photons share the same polarization. Thus Type-0 or Type-1 compatible crystals are used. Magnesium doped Lithium Niobate, potassium titanyl phosphate (KTP) and other crystals may also be used to produce signal-idler photon pairs of the same polarization.

As discussed above, interaction between pump photons and the crystal atoms is relatively infrequent. Thus the down-conversion effect is very weak, with an efficiency of about 1 part in $10^{12}$.

Having created entangled signal and idler photon pairs. the photon stream is fed through a dense wavelength division multiplexer 24 (DWDM 24). The DWDM separates the photons based on wavelength, effectively channelizing the stream. One stream exits the DWDM at 26 and is treated as the signal stream 26. The other stream exits the DWDM at 28 and is treated as the idler stream 28. Both signal stream 26 and idler stream 28 are fed through respective polarization controllers 30 and 32, which allow the system to control the photon polarizations independently, and to meet extant input polarization requirements The signal stream is fed to the phase modulator 34; whereas the idler stream is fed to a delay line 36. The phase modulator 34 may be implemented using a Pockels cell or other suitable medium having a refractive index which changes as a function of applied electric field. The change in refractive index imparts a phase shift upon photon streams passing through the medium. The delay line is placed in the optical path of the idler photons to ensure that both signal and idler photons arrive at the same time at the input of the second DWDM 38. The delay line 36 is used to ensure that the total path length between the signal and idler streams is the same. This also helps to ensure the phase relationship between the signal and idler streams is maintained, since different travel distances would alter that relationship. The second DWDM recombines the signal and idler signals into a common stream, which may then be communicated through a suitable optical fiber, waveguide, or free space.

Details of a Multi-Channel Encoder

Figure 2:
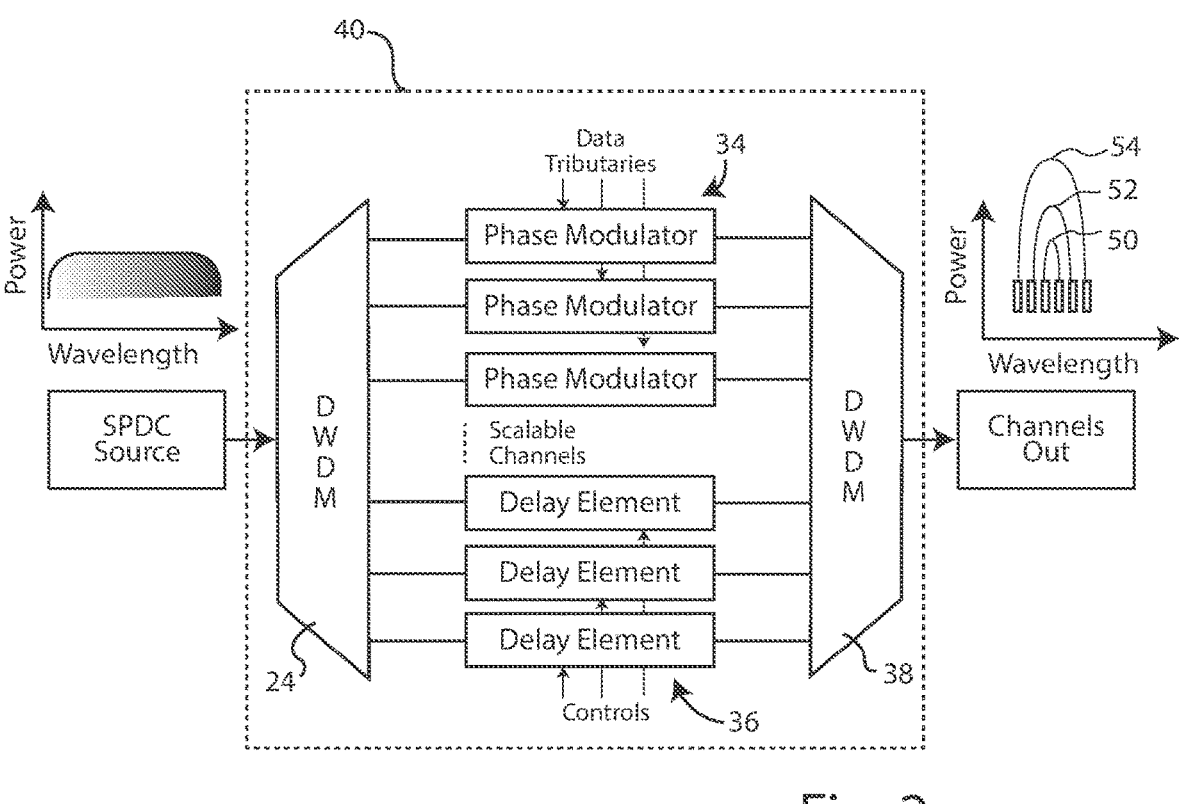

Referring to FIG. 2, a multi-channel embodiment of the quantum encoder is illustrated at 40. The multi-channel embodiment has multiple phase modulators 34 and multiple corresponding delay lines or delay elements 36. As illustrated, the entangled photons enter DWDM 24 as a continuous band of wavelengths and exit DWDM 38 as a channelized collection of entangled photon pairs, separated into channels based on wavelength. This channelization can be better understood with reference to FIG. 3

Figure 3:
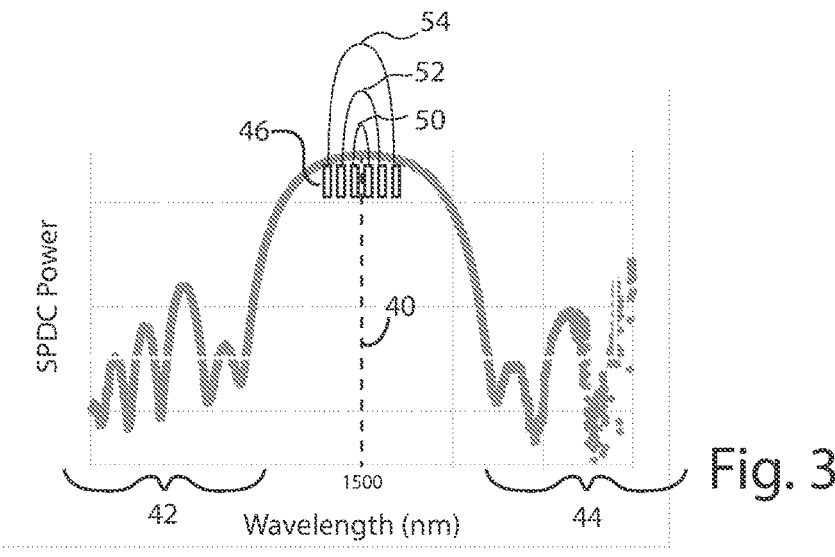
* and FIG. 3 is an example output spectrum of an SPDC process.

FIG. 3 illustrates the SPDC output spectrum as a continuous band of wavelengths centered around the center wavelength 40 of the filter 22 (FIG. 1a). Because filter 22 has largely filtered out the pump signal at 775 nm, the SPDC output spectrum represents signal-idler pairs of entangled photons. The side lobe spectra or modes in the regions 42 and 44 are not being used in the multi-channel encoder embodiment.

Essentially, the DWDM 24 establishes a plurality of spaced-apart wavelength channels 46 occupied by signal-idler photon channel pairs based on wavelength. By virtue of the quantum optical way in which the spontaneous parametric down conversion process operates, the signal and idler photons of each entangled pair will have individual wavelengths that are equally spaced about the center wavelength (1550 nm in this case). To illustrate, a first entangled channel pair might correspond to spaced-apart wavelengths shown at 50, a second entangled channel pair might correspond to spaced-apart wavelengths shown at 52, and a third channel pair at 55. The same entangled channel pair wavelength spacings about the center wavelength are also illustrated in FIG. 2.

As illustrated in FIG. 2, the channel pairs 50, 52 and 54 represent a single time slice, in which the photons of all channel pairs are tightly time-synchronized by virtue of having been created in a single quantum event by the SPDC process. If desired each channel pair can be encoded differently from the others—by supplying the phase modulators 34 with different encoding data. Alternatively, the channel pairs can all be encoded using identical encoding data—resulting in a higher power output.

Once combined by the DWDM 38, the channel pairs flow in parallel as a single stream, and yet retain their channelized identities, each stream of channel pairs carrying the data encoded by its respective encoder. Each stream of channel pairs can be separated later based on its photon wavelength.

The channelization into channel pairs gives a lot of message encoding flexibility. Each channelized stream can carry a separate unrelated messages, or the channelized pairs at each time slice can collectively represent bits of a larger message symbol.

Some Advantages of the Quantum Optical Communications Encoder

The quantum optical communications encoder captures the encoded message in a sequence of quantum-entangled photon pairs, where the message is represented by the superposition states of the sequence of entangled pairs. Measurement of the superposition state, by probing, detecting or otherwise reading the state of either or both of an entangled pair, breaks the superposition state of that pair, while leaving intact the superposition states of pairs which were not so measured.

When an eavesdropper attempts to read the quantum encoded message prior to reaching its authorized destination, every pair of entangled photons measured by the eavesdropper will have their superposition states destroyed, thus destroying that portion of the message. Such destruction makes it immediately apparent at the authorized destination that the message has been tampered with. Portions of the message which were not tampered with will still come through intact, but the authorized recipient will nevertheless see that that portions of the message have been potentially intercepted by the eavesdropper.

Using the above principle, a quantum-encoded data stream, comprising entangled photon pairs as described herein, can be transmitted along with a classically encoded (non-entangled) data stream to act as an eavesdropping or tampering indicator. In such application, the eavesdropper may be attempting to read the classically encoded message, but inadvertently "reads" the quantum-encoded message, breaking the entanglement in the process.

The disclosed encoder is based on waveguide technology, leading to more optimal size, weight, power and cost. Moreover, as demonstrated, the entangled photon pairs may be channelized, leading to increased configurability and scalability. The entanglement-based communication channel, made possible by the disclosed encoder, does not require quantum memory or quantum repeaters.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. Various changes may be made in the function and arrangement of elements described in an exemplary embodiment.

The invention claimed is:

1. An encoder for quantum communication comprising:
a source producing a stream of source photons at a source wavelength and a source energy;
a spontaneous parametric down-conversion device receiving the source photons and producing therefrom at least one entangled photon pair, wherein a first one of the photon pair is identified as a signal photon having a signal photon wavelength and a second one of the photon pair is identified as an idler photon having an idler photon wavelength,
the entangled photon pair having the following properties:
(a) the signal photon and the idler photon are correlated in their generation time by virtue of spontaneous parametric down conversion;
(b) the sum of the signal photon and the idler photon energies is equal to the source energy;
a first wavelength division multiplexer device defining on the basis of wavelength a signal photon path corresponding to the signal photon wavelength and an idler photon path having an associated second channel wavelength corresponding to the idler photon wavelength;
a phase encoder disposed in the signal or idler path and operable to alter the differential phase relationship of the signal and idler photons;
an encoding signal source coupled to the phase encoder to supply an encoding signal causing the phase encoder to alter the differential phase relationship of the signal and idler photons to thereby carry the encoding signal.

2. The encoder of claim 1 further comprising a delay line disposed in the idler path and operable to maintain time synchronization between the signal photon and the idler photon.

3. The encoder of claim 1 wherein the spontaneous parametric down-conversion device is a nonlinear photonic crystal.

4. The encoder of claim 1 wherein the signal photon path and the idler photon path collectively defining a communication channel.

5. The encoder of claim 1 further comprising second wavelength division multiplexer device coupled to merge the signal photon path and the idler photon path downstream of the phase encoder.

6. A multi-channel encoder for quantum communication comprising:
a source producing a stream of source photons at a source wavelength and a source energy;
a spontaneous parametric down-conversion device receiving the source photons and producing therefrom a plurality of entangled photon pairs, wherein a first one of each of the plurality of entangled photon pairs is identified as a signal photon having a signal photon wavelength and a second one of each of the plurality of entangled photon pairs is identified as an idler photon having an idler photon wavelength,
the plurality of entangled photon pairs having the following properties:
(a) the signal photon and the idler photon are correlated in their generation time by virtue of spontaneous parametric down conversion; and
(b) the sum of the signal photon and the idler photon energies for each pair is equal to the source energy;
a first wavelength division multiplexer device defining on the basis of wavelength a plurality of channels each having a signal photon path and an idler photon path,
wherein the signal photon and idler photon paths of each channel have respective signal photon and idler photon wavelengths that are different from all other channels;
a plurality of phase encoders disposed one each in the signal or idler paths of each channel and operable to alter the differential phase relationship of the signal and idler photons in the respective channel;
an encoding signal source coupled to each of the phase encoders to supply an encoding signal causing the phase encoder in each respective channel to alter the phase relationship of the signal and idler photons in that channel to thereby carry encoding signals in each of the channels.

7. The encoder of claim 6 further comprising a plurality of delay lines disposed in each idler path and operable to maintain time synchronization between the signal photon and the idler photon of each pair.

8. The encoder of claim 6 wherein the spontaneous parametric down-conversion device is a nonlinear photonic crystal.

9. The encoder of claim 6 further comprising second wavelength division multiplexer device coupled to merge the signal photon path and the idler photon path downstream of the phase encoder.

10. The encoder of claim 6 wherein a common encoding signal supplied to each of the phase encoders to thereby increase the power output an output of the encoder.

* * * * *